(12) United States Patent
Huang et al.

(10) Patent No.: US 10,917,168 B2
(45) Date of Patent: Feb. 9, 2021

(54) OPTICAL FIBER SENSING SYSTEMS, METHODS, STRUCTURES AND APPLICATIONS

(71) Applicant: NEC Laboratories America, Inc., Princeton, NJ (US)

(72) Inventors: Ming-Fang Huang, Princeton, NJ (US); Yue-Kai Huang, Princeton, NJ (US); Ezra Ip, West Windsor, NJ (US); Ting Wang, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/719,963

(22) Filed: Dec. 18, 2019

(65) Prior Publication Data
US 2020/0200592 A1 Jun. 25, 2020

Related U.S. Application Data

(60) Provisional application No. 62/783,422, filed on Dec. 21, 2018, provisional application No. 62/923,680, filed on Oct. 21, 2019, provisional application No. 62/923,682, filed on Oct. 21, 2019, provisional application No. 62/801,680, filed on Feb. 6, 2019.

(51) Int. Cl.
*H04B 10/071* (2013.01)
*H04B 10/077* (2013.01)
*G01H 9/00* (2006.01)
*G01M 11/00* (2006.01)

(52) U.S. Cl.
CPC ....... *H04B 10/071* (2013.01); *H04B 10/0775* (2013.01); *G01H 9/004* (2013.01); *G01M 11/319* (2013.01)

(58) Field of Classification Search
None
See application file for complete search history.

(56) References Cited

U.S. PATENT DOCUMENTS

| | | | |
|---|---|---|---|
| 2008/0101157 A1 | 5/2008 | Ronnekleiv et al. | |
| 2014/0226970 A1* | 8/2014 | Urban | H04L 12/44 398/21 |
| 2018/0120173 A1 | 5/2018 | Park | |

\* cited by examiner

*Primary Examiner* — Jerry Rahll
(74) *Attorney, Agent, or Firm* — Joseph Kolodka

(57) ABSTRACT

Aspects of the present disclosure describe systems, methods and structures and applications of optical fiber sensing. Of significance, systems, methods, and structures according to aspects of the present disclosure may reuse and/or retrofit/upgrade existing optical fiber cables as part of optical fiber sensing that may find important societal application including intrusion detection, road traffic monitoring and infrastructure health monitoring. Combining such optical fiber sensing with artificial intelligence (AI) further enables powerful applications at low(er) cost.

3 Claims, 23 Drawing Sheets

(c)

OPTICAL FIBER SENSING SYSTEMS, METHODS, STRUCTURES AND APPLICATIONS

CROSS REFERENCE TO RELATED APPLICATIONS

This application claims the benefit of U.S. Provisional Patent Application Ser. No. 62/783,422 filed 21-DEC-2018, U.S. Provisional Patent Application Ser. No. 62/923,680 filed 21-OCT-2019, U.S. Provisional Patent Application Ser. No. 62/923,682 filed 21-OCT-2019, and U.S. Provisional Patent Application Ser. No. 62/801,680 filed 6-FEB-2019, the entire contents of each of which are incorporated by reference as if set forth at length herein.

TECHNICAL FIELD

This disclosure relates generally to optical fiber sensing and more particularly to distributed optical fiber sensing (DFOS) including distributed temperature sensing (DTS), distributed vibration sensing (DVS), distributed acoustic sensing (DAS), and Brillouin optical time domain reflectometry (BOTDR)—among others—that are advantageously overlaid onto passive optical communications networks.

BACKGROUND

Distributed optical sensing has found great utility in a variety of applications of significant commercial and societal importance including pipeline leak and intrusion detection. Typically, in such applications, a dedicated optical fiber—separate from any optical fiber used for communications—is employed to provide such sensing. As may be readily appreciated, such dedicated optical sensing fiber(s) requires considerable deployment and maintenance cost(s).

SUMMARY

An advance in the art is made according to aspects of the present disclosure directed to distributed optical fiber sensing systems, methods, structures, and applications thereof.

In sharp contrast to the prior art, distributed optical fiber sensing systems, methods, and structures according to aspects of the present disclosure advantageously employ commercial communications optical fiber networks thereby providing a sensing overlay on such communications networks.

As we shall now show and describe, distributed optical fiber sensing systems, methods, and structures according to aspects of the present disclosure may advantageously overlay on wavelength-division multiplexing (WDM) networks—including passive optical networks (PONs)—such that communication channels and optical fiber sensing signal(s) coexist on the same physical fiber that may extend from—for example—an optical line terminal (OLT) to an optical network unit (ONU). Of further advantage, when an optical fiber comprises a bundle of fibers, that bundle may provide separate, dynamic sensing elements for temperature (DTS), vibration (DVS), and acoustic (DAS) detection.

BRIEF DESCRIPTION OF THE DRAWING

A more complete understanding of the present disclosure may be realized by reference to the accompanying drawing in which:

FIGS. 8(A)-8(E) show a series of plots associated with the experimental results for the arrangement of FIG. 7 in which: FIG. 8(A) is a plot of BER vs received power for a 6-Gbaud PAM-4 signal; FIG. 8(B) is a plot of OTDR trace captured by sensing channel when SOAs of distributions fibers #1 and #2 are switched on consecutively; FIG. 8(C) is a plot of Phase vs. Time of phase evolution; FIG. 8(D) is a plot of Amplitude vs Frequency of its spectrum measured on fibers #1 and #2; and FIG. 8(E) is a plot of Phase vs Voltage for measured phase amplitude vs applied piezo voltage; according to aspects of the present disclosure;

FIGS. 9(A)-9(C) show a series of waterfall plots for: FIG. 9(A) walking; FIG. 9(B) driving; and FIG. 9(C) driving—all using DAS based on coherent detection of Rayleigh backscatter each with a respective sample amplitude trace at fiber position impacted by vibration in which the speed of the vibration source may be inferred by the slope according to aspects of the present disclosure;

FIG. 11(A) an illustrative DFOS system mounted on a fence and FIG. 11(B) waterfall plots recorded for different vibration events which may be classified by machine learning according to aspects of the present disclosure;

FIG. 12(A) a waterfall plot showing vehicular traffic patterns; FIG. 9(B) a machine learning schematic arrangement to determine vehicular direction and average speed; and FIG. 9(C) constellation diagrams of PS-144QAM channels counter-propagating against the DFOS system according to aspects of the present disclosure; FIG. 13(A) bridge structural health monitoring using DOFS; and FIG. 13(B) AI classification of bridge health showing distribution of "Anomaly score" before and after renovation according to aspects of the present disclosure.

Figure 1:
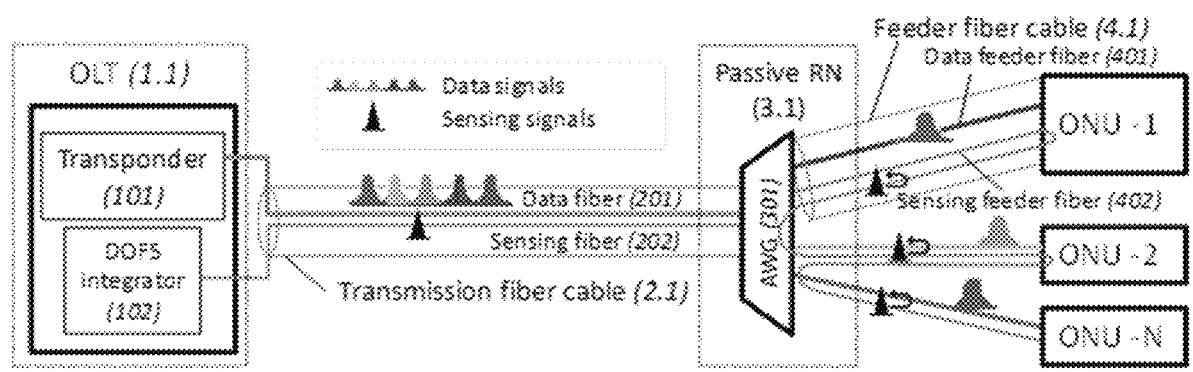
FIG. 1 shows a schematic diagram of an illustrative architecture/arrangement for distributed optical fiber sensing (DOFS) over WDM-PON with loop-back from ONUs according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale and where possible, common reference numerals are used throughout the FIGS.

Operational Overview

FIG. 1 shows a schematic diagram of an illustrative architecture for distributed optical fiber sensing (DOFS) over a WDM-PON with loop-back from ONUs according to aspects of the present disclosure.

As may be observed from that figure, the optical line terminal (OLT) (1.1) includes transponder (101) for data transmission and DFOS integrator (102) for sensing. As will be understood and appreciated by those skilled in the art, such sensing may include —for example—DTS, DVS, DAS and/or BOTDR—among others—depending on the particular configuration employed. In the architecture illustratively shown in the figure(s), the sensing elements are advantageously not only useful to evaluate network performance (fiber route loss) but may also be employed to assess environmental conditions such as vibration, temperature, acoustic, etc., along the entire fiber route to determine—for example—structure (building) health, fire prevention and acoustic (gunshot) detection, etc.

Typically, an existing transmission optical fiber cable (2.1) includes multiple, individual fiber bundles. For contemporary WDM-PON systems, one of the fibers may be used as data fiber (201) to transmit data signals, while other fibers may be not used (i.e., "dark fibers"). According to aspects of the present disclosure, one or more dark fibers is/are employed as sensing fiber (202) to transmit sensing signals from OLT (1.1) to remote node (3.1).

In the RN, regular 2 input ports of array waveguide grating (AWG) (301) is used to split data signals and deliver them to ONUs via feeder fibers (401). Similar to transmission fiber cable (2.1), feeder fiber cable (4.1) may also include multiple individual fibers. According to aspects of the present disclosure, two or more of dark fibers comprising feeder fiber cable (4.1) are employed as sensing feeder fiber(s) (402).

In order to realize a loop-back sensing system, two sensing feeder fibers (402) are used to connect an individual ONU to the RN (3.1). As such, sensing signals can be conveyed through each ONU thereby achieving that communication fiber bundle(s) are used as sensing fibers. Accordingly, if the transmission fiber cable (2.1) and feeder fiber cable (4.1) are buried underground, sensing of—for example—road condition, pavement distress and/or road traffic can be monitored. Meanwhile, the fire prevention, gunshot detection and structure health monitoring can be realized when the fiber cables passing through poles, bridges, telecom towers, ONUs etc.

Figure 2:
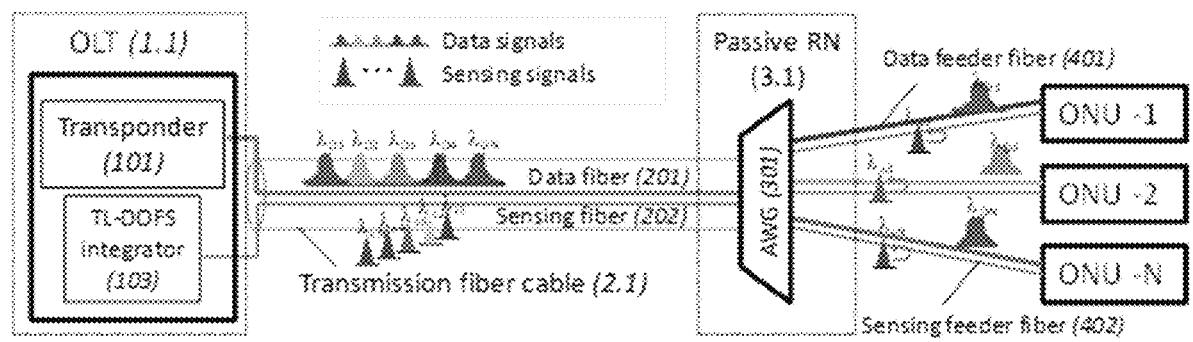
FIG. 2 shows a schematic diagram of an illustrative architecture/arrangement for distributed optical fiber sensing (DOFS) over WDM-PON with tunable DOFS integrator according to aspects of the present disclosure.

FIG. 2 shows a schematic diagram of an illustrative architecture/arrangement for distributed optical fiber sensing (DOFS) over WDM-PON with tunable laser (TL-DOFS) integrator (103) according to aspects of the present disclosure.

With reference to that figure, it may be observed and as noted above that the TL-DOFS integrator includes a tunable laser (TL) instead of fixed wavelength laser. Operationally, in every cycle of pulse frequency, the TL-DOFS integrator will change the wavelength to match data signals in order to pass through a same port of AWG (301) in the RN (3.1) and subsequently direct same to the ONUs simultaneously.

By way of illustrative example only, the entire distance from OLT to ONU is 30 km which corresponds to ~1000 Hz. Accordingly, at a frequency of 1000 Hz, the TL-DOFS integrator tunes the laser frequencies from $\lambda_{s1}$ to $\lambda_{sN}$, which are located in the same ITU grids as $\lambda_{D1}$~$\lambda_{DN}$. In this illustrative architecture, only one dark fiber included with feeder fiber cable (4.1) is used as sensing feeder fiber (402).

Figure 3:
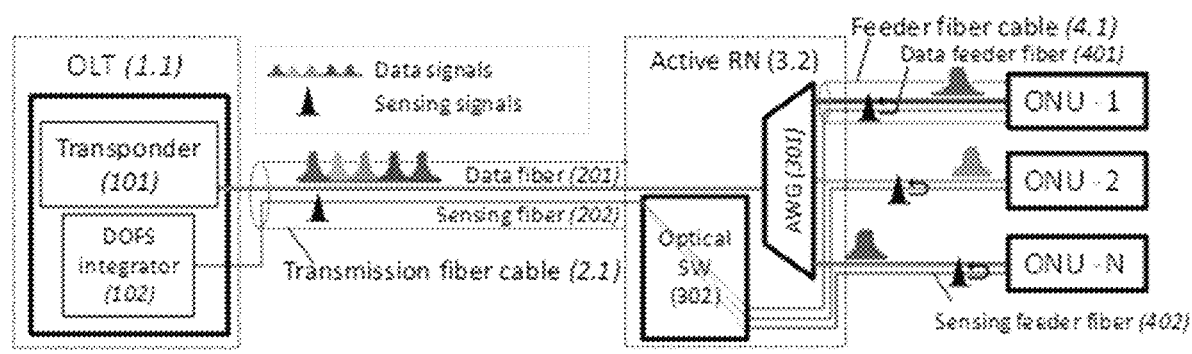
FIG. 3 shows a schematic diagram of an illustrative architecture/arrangement for distributed optical fiber sensing (DOFS) over WDM-PON with optical switch in remote node (RN) according to aspects of the present disclosure.

FIG. 3 shows a schematic diagram of an additional illustrative architecture/arrangement for distributed optical fiber sensing (DOFS) over WDM-PON with an optical switch positioned in a remote node (RN) according to aspects of the present disclosure. As may be observed from this figure, instead of a passive RN, an active RN (3.2) including an AWG (301) and an optical switch (SW) (302) is employed in this illustrative architectural arrangement. Data fiber (201), included within transmission fiber cable (2.1) is in optical communication with AWG (301) and configured as in a "regular" WDM-PON configuration. Meanwhile, an optical SW (302) in the RN (3.2) is employed to switch sensing signals. Such optical SW connects sensing fiber (202) and sensing feeder fiber(s) (402). Based on requirements from various applications and/or customers, different sensing elements can be provided to different ONUs at a time. For example, the system can provide temperature sensing to ONU-1 and acoustic sensing to ONU-2—and may advantageously employ and interrogate them concurrently.

Figure 4:
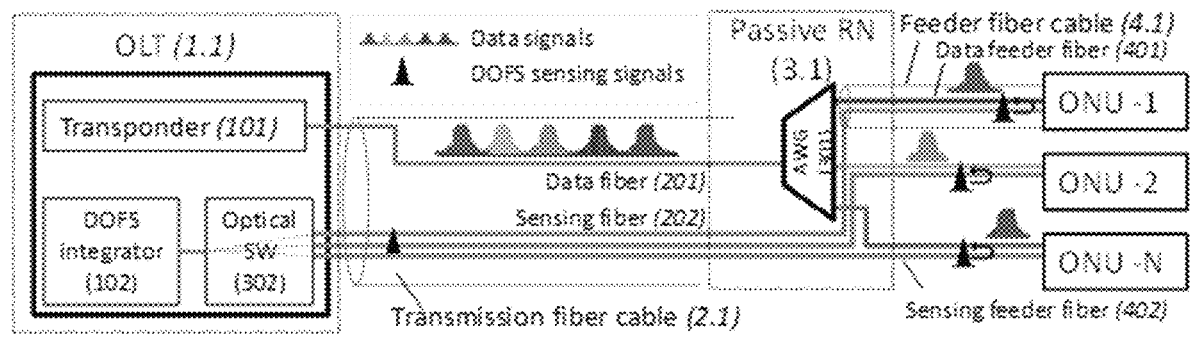
FIG. 4 shows a schematic diagram of an illustrative architecture/arrangement for distributed optical fiber sensing (DOFS) over WDM-PON with optical switch in optical line terminal (OLT) according to aspects of the present disclosure.

FIG. 4 shows a schematic diagram of an yet another illustrative architecture/arrangement for distributed optical fiber sensing (DOFS) over WDM-PON with an optical switch positioned in an optical line terminal (OLT) according to aspects of the present disclosure. As may be observed from that figure, the illustrative arrangement includes an optical switch (302) to deliver sensing signals to the ONUs. as may be observed further, the switch in this illustrative configuration is located in the OLT, and not in the RN as in previously described arrangements—above. We note that in this illustrative arrangement, the remote node may advantageously be passive instead of active—thereby further reducing operationally complexity and cost as compared to those other arrangements shown.

Figure 5:
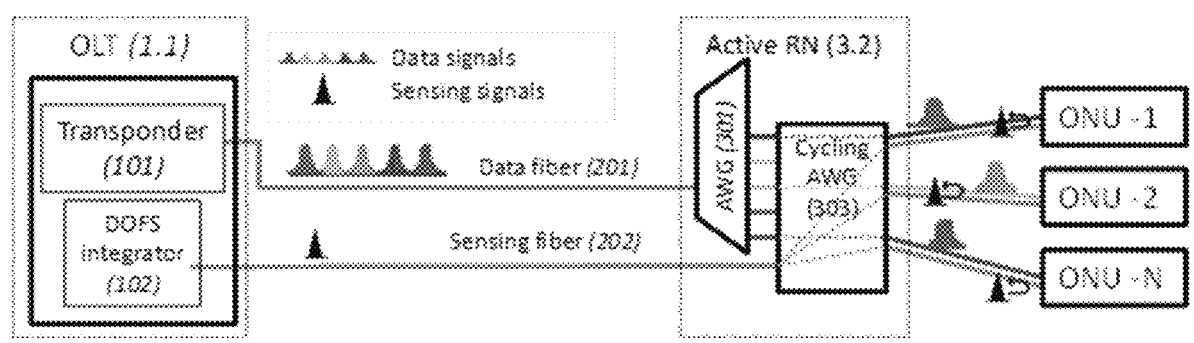
FIG. 5 shows a schematic diagram of an illustrative architecture/arrangement for distributed optical fiber sensing (DOFS) over WDM-PON with cycling arrayed waveguide grating (AWG) in remote node (RN) according to aspects of the present disclosure.

FIG. 5 shows a schematic diagram of a yet another illustrative architecture/arrangement for distributed optical fiber sensing (DOFS) over WDM-PON with a cycling arrayed waveguide grating (AWG) in in remote node (RN) according to aspects of the present disclosure. As may be observed from this figure, the one AWG (301) and one cycling AWG (CAWG) (303) is in the RN (3.2). Data fiber (201) located inside/as part of overall transmission fiber cable bundle (2.1) is optically connected to the AWG (301) while sensing fiber (202) is linked to an input port of CAWG (303). Other input(s) of CAWG (303) is/are connected to output(s) of AWG (301) while outputs are joined to feeder fiber cable. The sensing signals are sent to different sensing feeder fiber through CAWG with different delay, hence, the locations of the sensing elements can be discovered.

Figure 6:
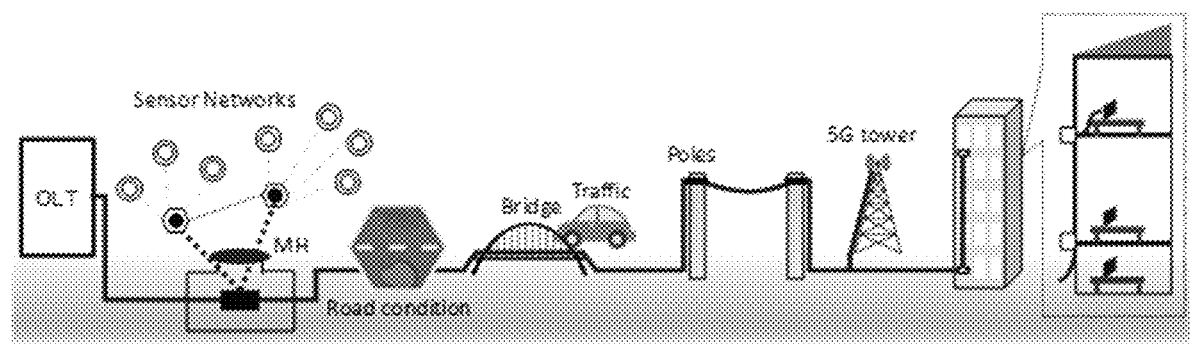
FIG. 6 shows a schematic diagram of an illustrative architecture/arrangement for distributed optical fiber sensing (DOFS) showing a general fiber layout from OLT to ONU according to aspects of the present disclosure.

FIG. 6 shows a schematic diagram of still another illustrative architecture/arrangement for distributed optical fiber sensing (DOFS) showing a general fiber layout from OLT to ONU according to further aspects of the present disclosure. As may be observed from that figure, the illustrative optical fiber sensor arrangement includes a fiber layout—including both data communications and sensor fiber—from OLT to ONU which illustratively passes through transportation facilities (i.e. manholes (MH), roads, bridges, etc.), carrier facilities (poles, towers, etc.) and buildings. When so arranged, the entire fiber route acts as a sensing medium which can be used for facilities health monitoring, smart traffic management for smart city applications. Furthermore, when the sensing fiber is installed such that it enters a building—for example—it may provide in-building social sensing when the fiber located inside the building is so utilized. The sensing applications illustrated along the entire route shown in the figure are listed in Table 1.

TABLE 1

| Sensing in Central Office | Facility Sensing Applications | In-Building Sodal Sensing Applications |
|---|---|---|
| Distributed Vibration Sensing | Cable condition (cable cut prevention, intrusion detection, etc.) Road condition and health monitoring for bridges, towers, poles, etc. | Building health monitoring |
| Distributed Temperature Sensing | Manhole icing/frozen detection | Fire prevention |
| Distributed Acoustic Sensing | Falling rock detection | In-building gun shoot detection |
| Distributed Gas Sensing | Gas leaks ($CH_4$, etc.) detection | Air quality detection ($CO_2$, CO, $CH_4$, etc.) |

Summary of sensing applications along entire fiber route of illustrative network.

ILLUSTRATIVE EXAMPLES

We now disclose an illustrative passive optical network (PON) which employs a reflective semiconductor optical amplifier (RSOA) at each optical network unit (ONU) to advantageously enable simultaneous data transmission with distributed optical fiber sensing (DOFS) on all distribution fibers.

Of interest to those skilled in the art, we make existing PONs further compatible with DFOS by adding low-cost reflective semiconductor optical amplifiers (RSOAs) at ONUs. Operationally, we employ a time-domain multiplexed (TDM) scheme where an external control turns on/off the RSOAs at each ONU to allow DOFS on each individual distribution fiber. Our experimental results of such arrangement(s) show(s) that we overcome the roundtrip loss of a 1×32 splitter, as we successfully conducted DAS at a resolution of 1 m when we employed two pizeroelectric vibration sources coupled to different distribution fibers and simultaneously measured them without interference. We were also able to use the same system to detect vibrations from pedestrian and vehicular traffic for a cable buried next to a roadway. Such DAS system coexisted with a two-way PAM4-based 10-Gb/s communication link which can be used for front-haul access.

Hybrid Data Transmission/Sensing PON Architecture

Figure 7:
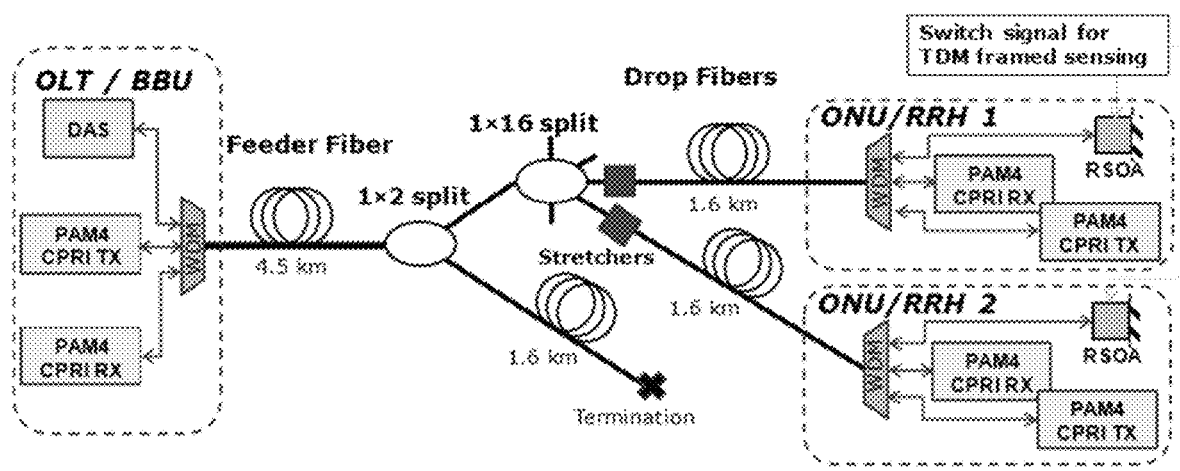
FIG. 7 shows a schematic diagram of an illustrative, experimental architecture/arrangement for distributed optical fiber sensing (DOFS)—compatible PON in which wavelength multiplexers/demultiplexers combine upstream (US), downstream (DS) and sensing channels, and a reflective SOA at each ONU enables DOFS on each individual distribution fiber according to aspects of the present disclosure.

The illustrative example hybrid transmission/sensing PON architecture/arrangement is shown schematically in FIG. 7. As may be observed, FIG. 7 shows a schematic diagram of an illustrative, experimental architecture/arrangement for distributed optical fiber sensing (DOFS)—compatible PON in which wavelength multiplexers/demultiplexers combine upstream (US), downstream (DS) and sensing channels, and a reflective SOA at each ONU enables DOFS on each individual distribution fiber according to aspects of the present disclosure;

At the optical line terminal (OLT), the sensing channel (1550 nm), and the 10-Gb/s upstream (1561 nm) and downstream (1546 nm) channels are combined using a wavelength multiplexer. The PON consists of a 4.4-km spool feeder fiber, followed by a 1×32 passive splitter, followed by distribution fibers that are 1.6 km long. The optical network units (ONU) include a wavelength demultiplexer, where the upstream (US) and downstream (DS) ports are connected to PAM4 receivers (Rx) and transmitters (Tx), respectively, and the sensing port is terminated by an RSOA. When the RSOA is turned on at a particular ONU, the forward-propagating sensing pulse is amplified and reflected, becoming a backward propagating sensing pulse which generates its own optical time-domain reflectometry (OTDR) signal. This secondary OTDR signal is initially forward-propagating, where upon impinging the RSOA, it is amplified and subsequently reflected back towards the OLT.

Figure 8A:
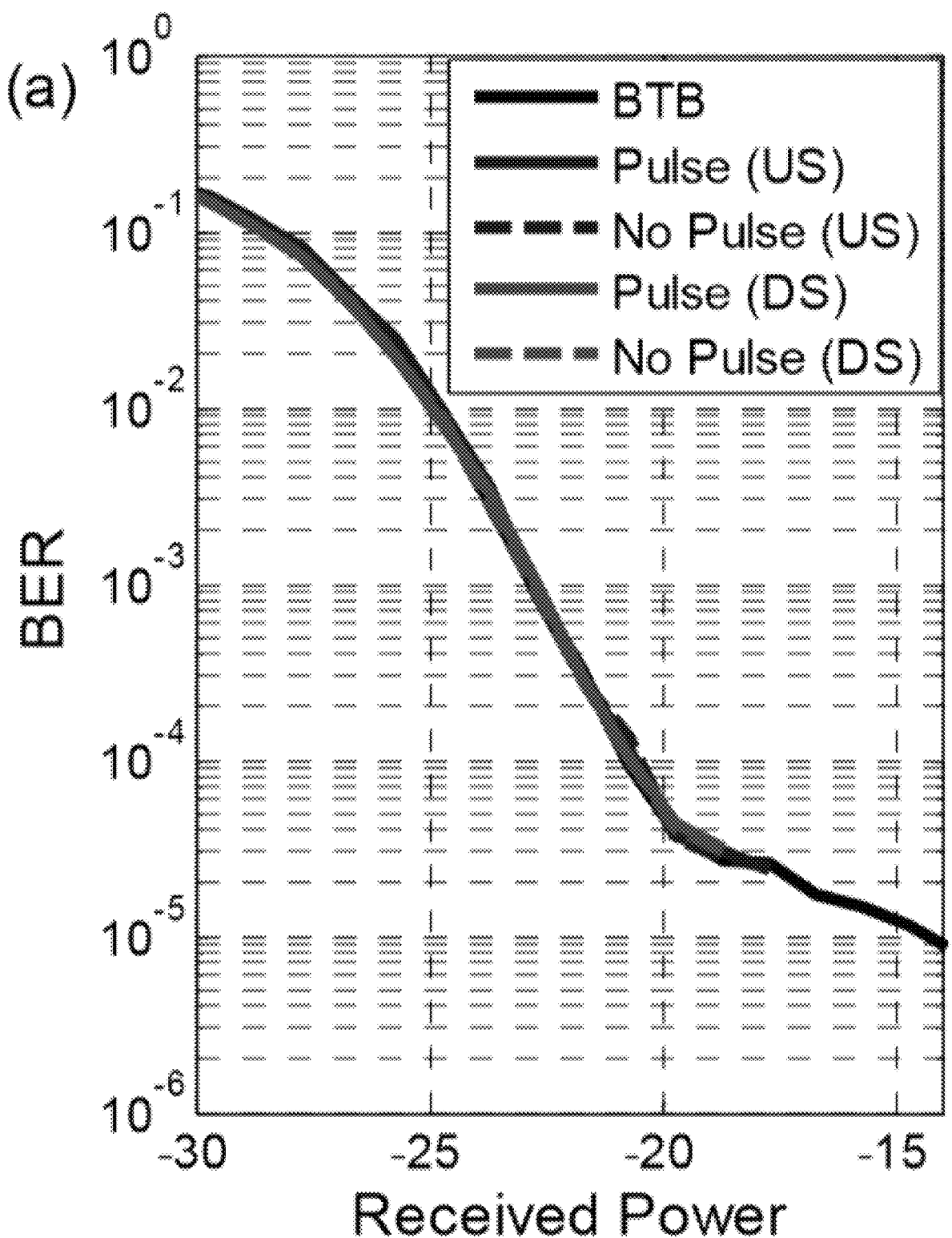
Figure 8B:
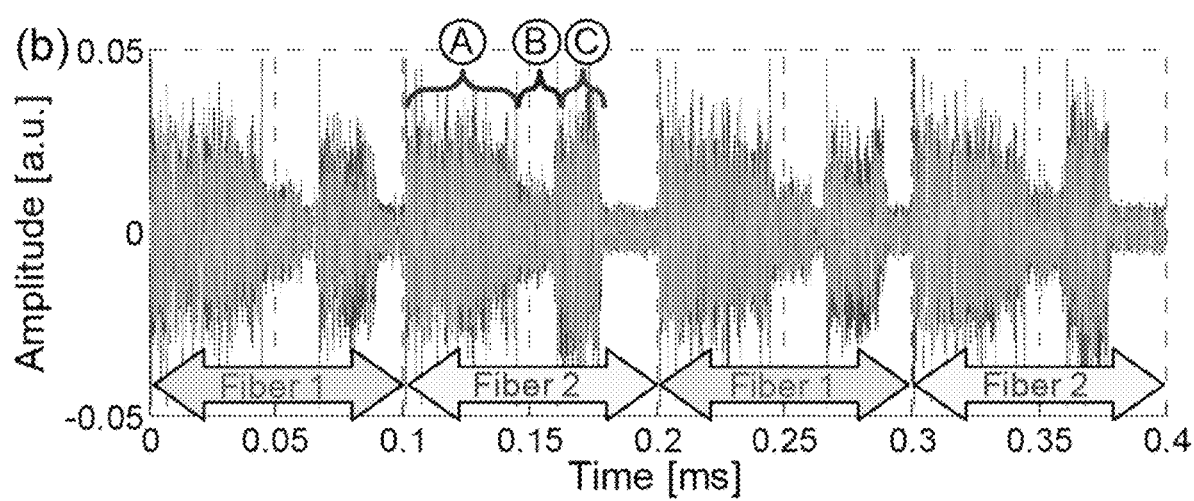

A sample OTDR trace measured at the OLT is shown in FIG. 8(B). In each "frame" corresponding to the RSOA of one ONU being turned on, the initial portion (A) of the trace is Rayleigh backscatter of the feeder fiber. This is followed by the weaker backscatter (due to the 1×32 splitter) of the 1.6-km distribution fiber (B). The amplified secondary backscatter of the distribution fiber created by the backward-propagating sensing pulse follows in (C).

Using the architecture/arrangement shown in FIG. 7, we can interrogate each distribution fiber selectively by turning on/off the RSOA in that ONU. We note that a master controller at the OLT may be employed to turn on/off the RSOAs. As will be appreciated by those skilled in the art, when a particular distribution fiber is interrogated, the RSOAs at all other ONUs must be turned off so they do not interfere with the OTDR of the desired distribution fiber. Since each of the 31 other distribution fibers contributes a Rayleigh backscatter from the forward-propagating sensing pulse, the sum of these is an interference that overlaps with (B) in FIG. 8(B). To ensure this interference does not extend into the desired portion (C) which is used for DAS, it is necessary to ensure all distribution fibers are the same length.

Experimental Results.

To evaluate our arrangement, we performed transmission of 6-Gbaud PAM4 over the hybrid PON/DAS architecture shown in FIG. 7. FIG. 8(A) shows BER vs received power for back-to-back, upstream and downstream transmission with and without the sensing signal present. Due to the low accumulated chromatic dispersion (CD), there is no observable transmission penalty. In addition, the presence of the sensing pulse train had negligible impact on performance, proving the compatibility of data transmission with sensing in our scheme. We note that in January 2018, the 3rd Generation Partnership Project (3GPP) released the first version of the specification on the Ethernet Common Public Radio Interface (eCPRI) used for 5G fronthaul. The 25G eCPRI has almost certainly been designated as the 5G fronthaul interface. The 25G single-channel interface will likely be a mainstream interface for 5G fronthaul.

To verify the correct operation of the DOPS function, we performed distributed acoustic sensing (DAS) by coherently detecting the OTDR of the Rayleigh backscatter (FIG. 8(B)). Two piezoelectric fiber stretchers are inserted at the input of two distribution fibers as shown in FIG. 7. The drive signals for each fiber stretcher are set to 5 V amplitude, and at frequencies of 100 Hz and 133 Hz, respectively. Sensing pulses of 100 ns duration (spatial resolution ~1 m) are launched into the PON at a repetition rate of 10 kHz. The RSOAs at the end of the two distribution fibers are turned on consecutively every other pulse, resulting in an acoustic sampling rate of 5 kHz for each fiber.

The optical phase change generated by the acoustic signal is measured by offline digital signal processing (DSP) of the coherent OTDR. The front-end DSP operations includes resampling, filtering, and DSP emulation of an interferometer with differential length of 2 m. We then normalize the power of the differential beat signal at each distance, followed by bandpass filtering to produce "waterfall plots" showing the evolution of the vibration amplitude in time for different fiber positions. The frame rate of 5 kHz means that acoustic frequencies up to 2.5 kHz can be measured.

Figure 8C:
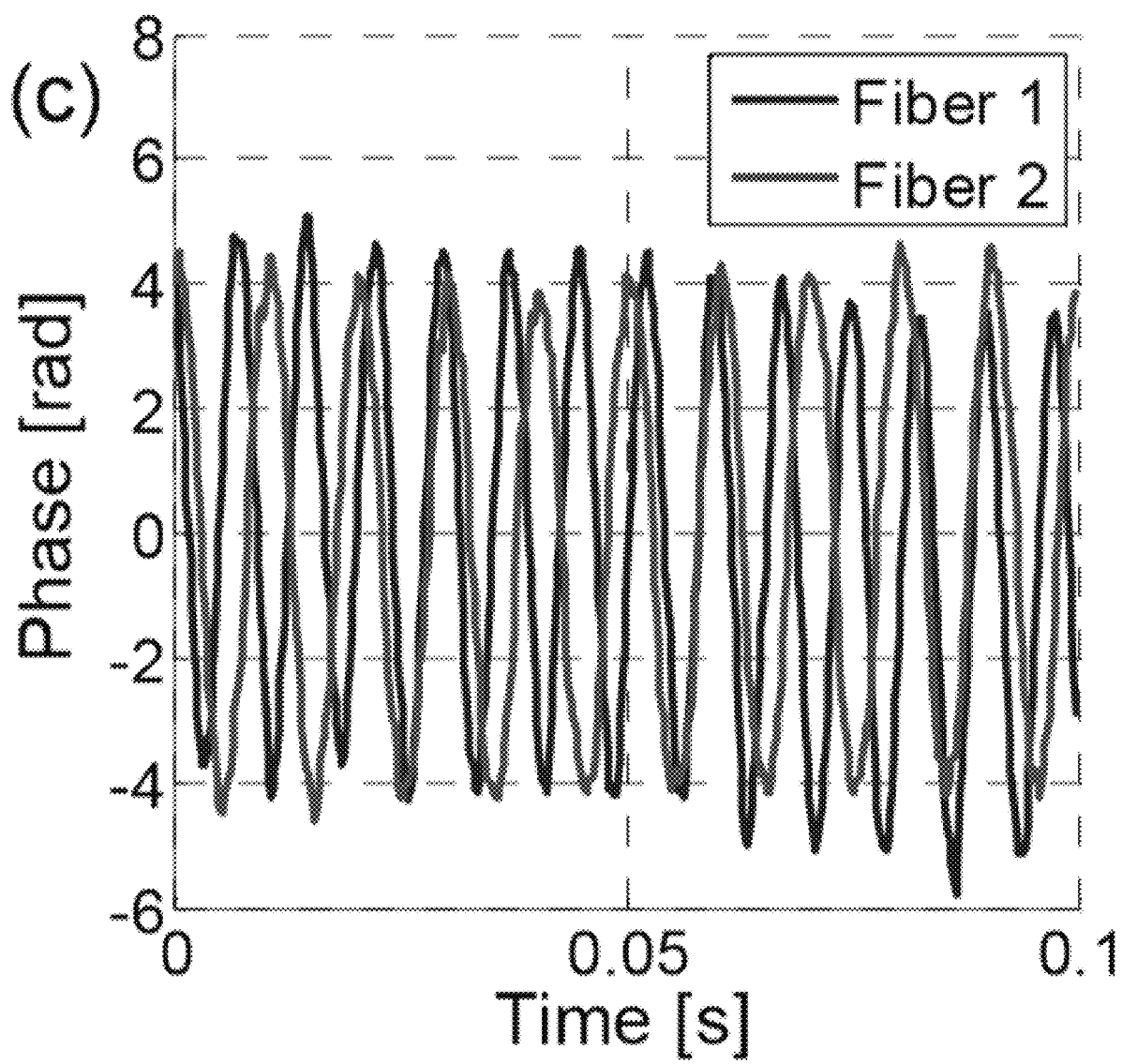
Figure 8D:
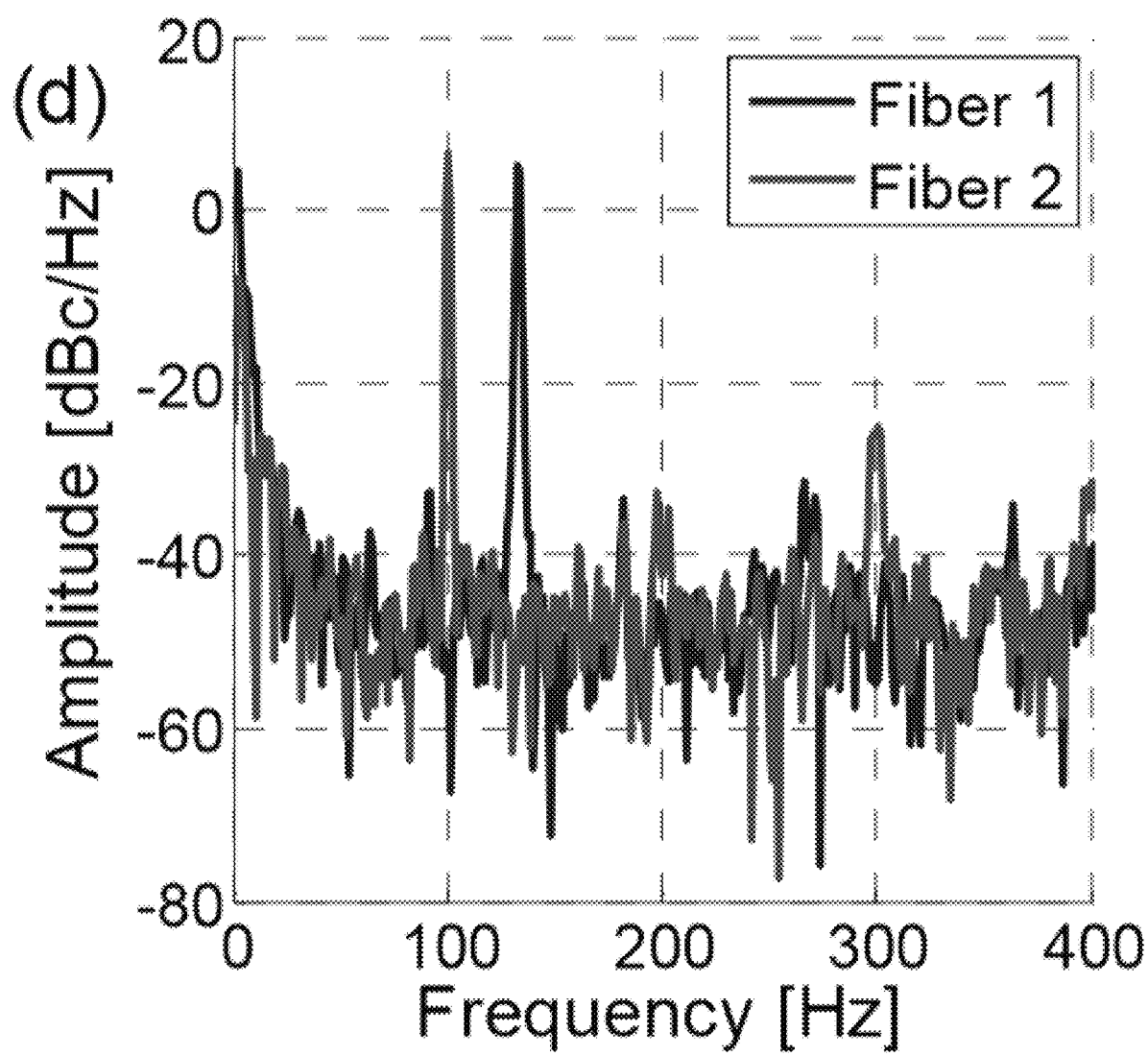
Figure 8E:
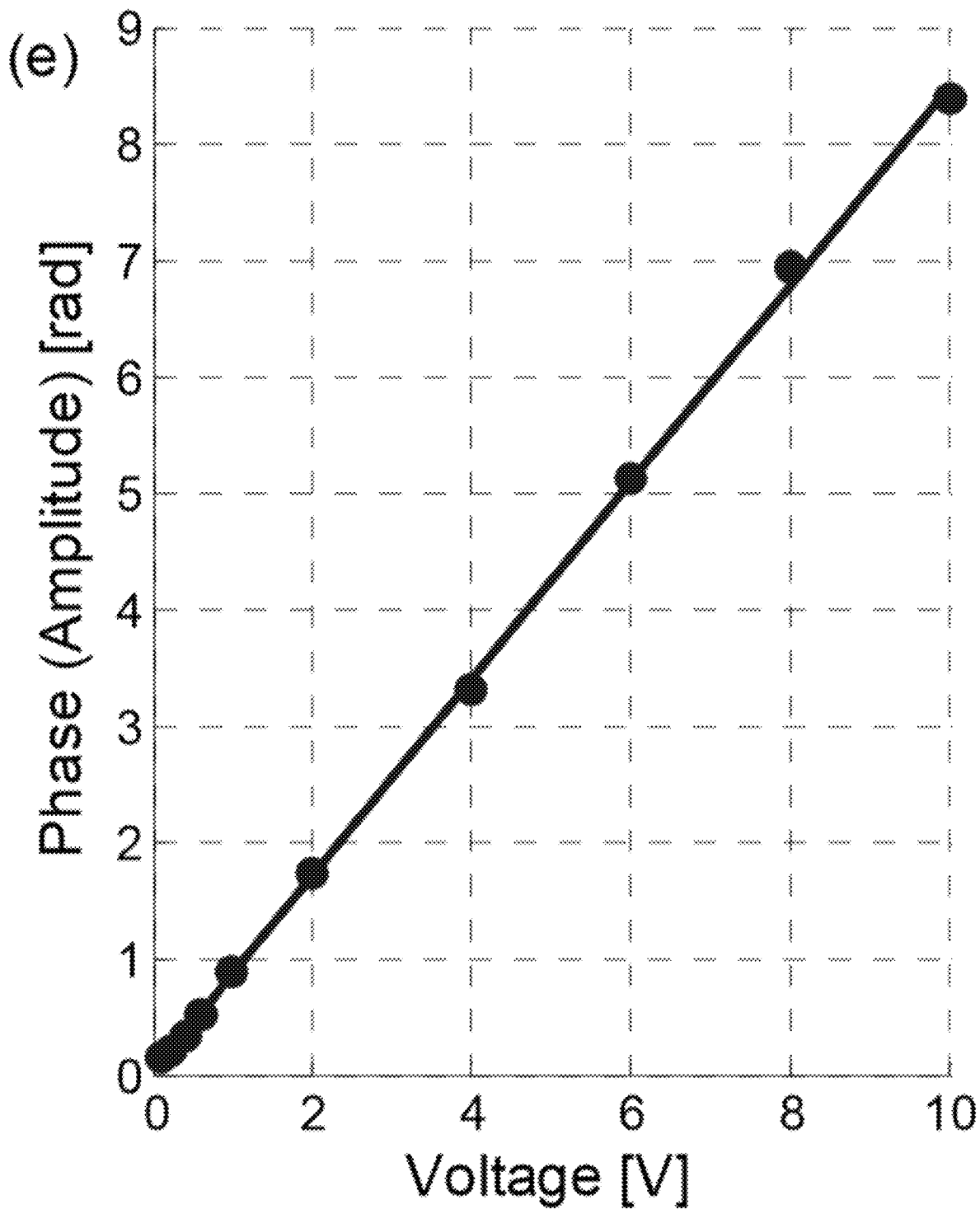

FIG. 8(C) shows the acoustic phases measured at the position of the piezo-stretcher for each distribution fiber (amplitude ~4.3 rad). FIG. 2(D) shows the acoustic spectrum at the same position. The noise floor corresponds to a strain level of ~0.35/$\sqrt{Hz}$. We swept the amplitude of the drive signal at one of the distribution fibers and measured the amplitude of the acoustic phase, and the result is shown in FIG. 2(E).

Figure 9A:
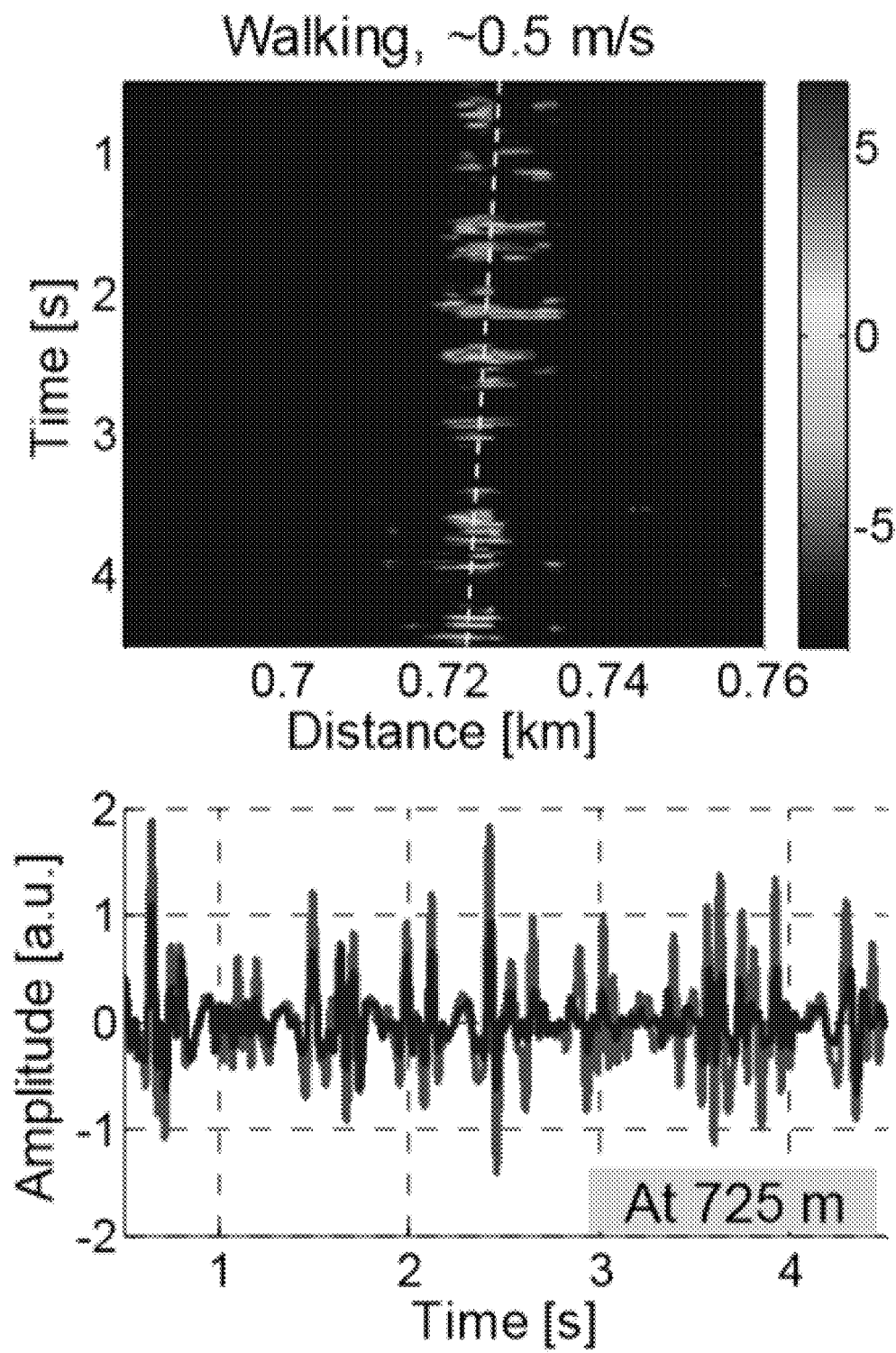
Figure 9B:
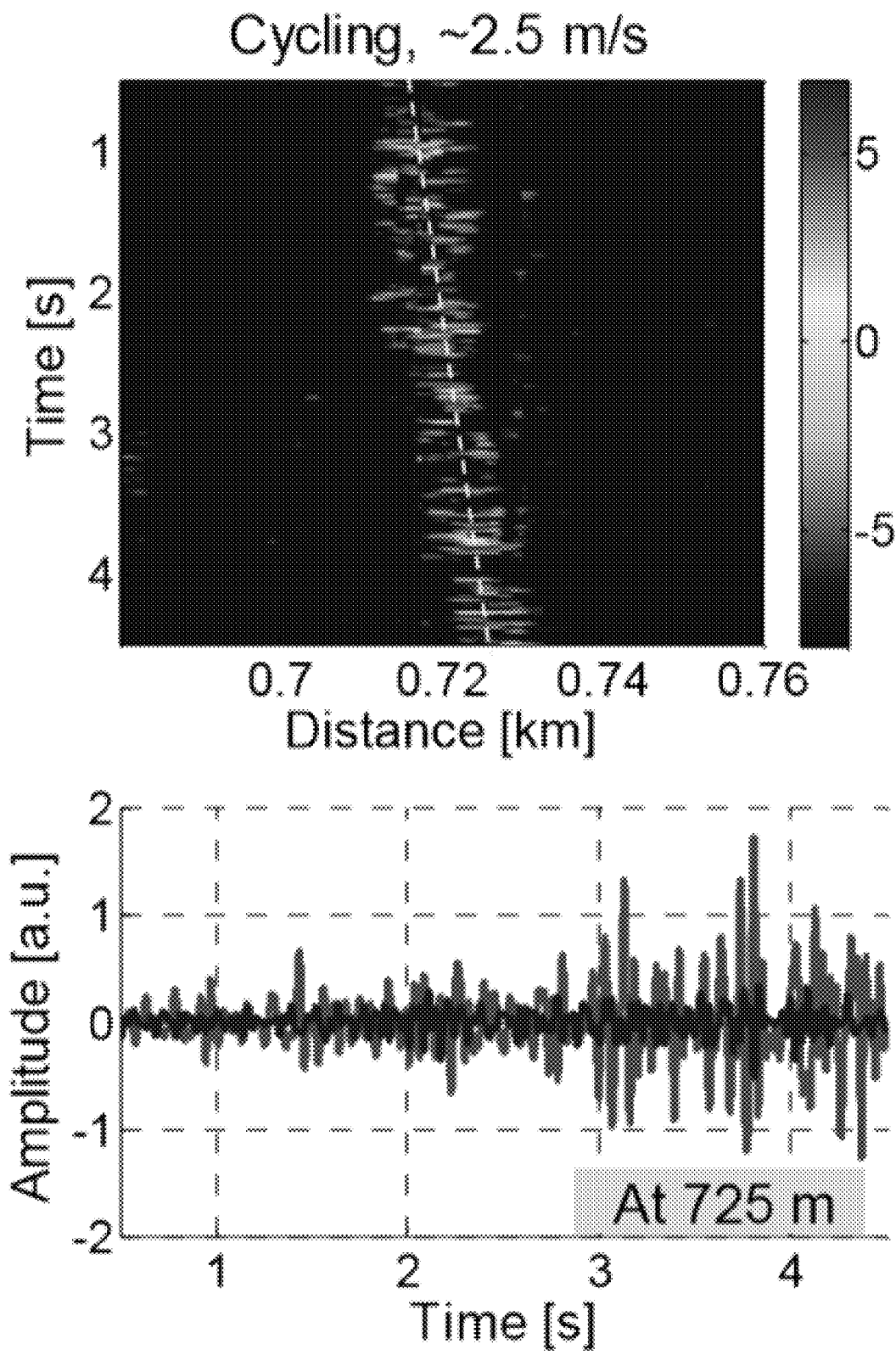
Figure 9C:
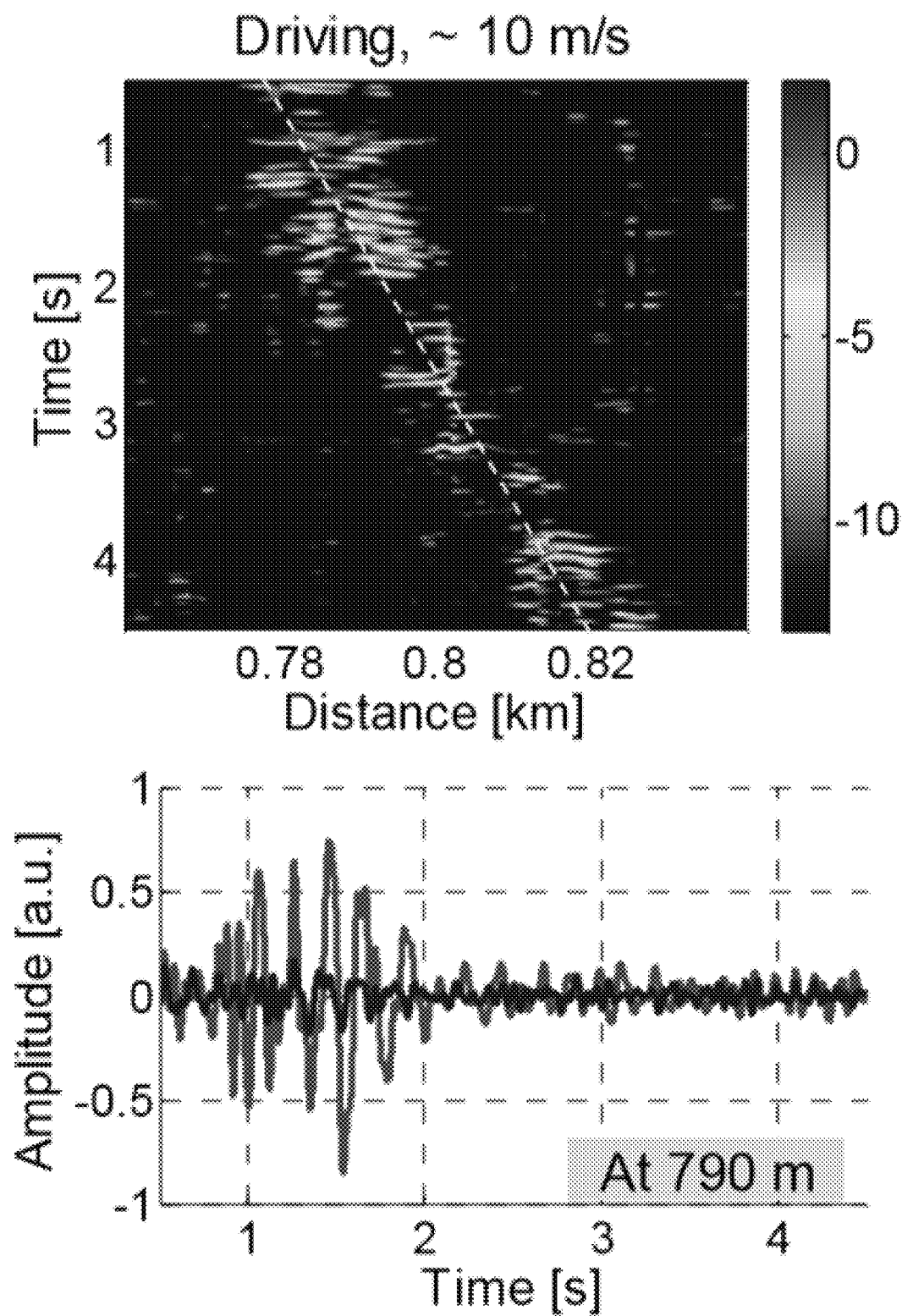

Finally, we used the DOPS to measure real world vibration by connecting a 400 m long buried optical fiber cable between the output of the 1×32 splitter and one of the distribution fibers (FIG. 7). The cable is buried at a depth ~50 cm. We measured the vibration generated by (a) walking and (b) slow cycling next to the buried cable at a distance of ~1 m, as well as (c) driving next to the cable at a distance of ~5 m. FIG. 9(A)-FIG. 9(C) shows "waterfall" plots recorded by the DOPS, and the real/imaginary waveforms at the positions shown. The slope of the waterfall plot can be used to infer the speed of the vibration source: steeper/shallower slopes correspond to slower/faster movements, respectively. The estimated speeds of walking, cycling and driving were ~0.5 m/s, 2.5 m/s and 10 m/s, respectively.

At this point those skilled in the art will recognize and appreciate that we have demonstrated a new PON architecture which allows simultaneous 5G mobile backhaul transmission at 10 Gb/s and distributed optical fiber sensing of each distribution fiber. The enabling technologies are RSOAs placed at each ONU, which can be selectively turned on to generate a backward propagating sensing pulse that can interrogate each distribution fiber. The upstream and downstream data channels, and the sensing channels coexist on three separate wavelengths. We successfully demonstrated distributed acoustic sensing (DAS) based on coherent OTDR using this architecture Bidirectional Dual-Usage Fiber Architecture/Arrangement and Application Thereof As we have previously noted and as should be readily appreciated by those skilled in the art, our optical data communications/sensing architecture(s)/arrangement(s) according to the present disclosure allow for the reuse of existing optical cables providing distributed sensing using—for example—a bidirectional, dual-band architecture where communications and sensing signals coexist.

Figure 10:
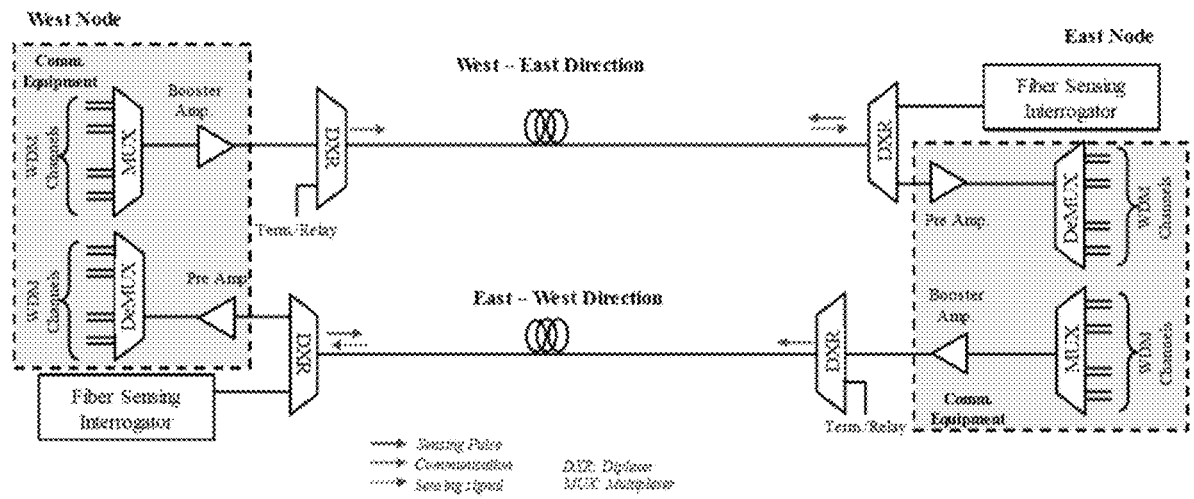
FIG. 10 shows a schematic diagram of an illustrative, experimental architecture/arrangement for bidirectional dual-usage fiber sensing where communications and sensing applications coexist on different wavelengths and the sensing pulse(s) and communications channels propagate in different directions in the optical fiber to mitigate any nonlinear interference according to aspects of the present disclosure.
Figure 10:
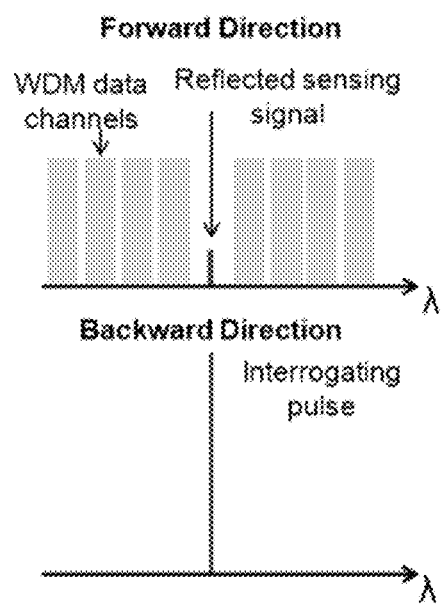

FIG. 10 shows an illustrative architecture/arrangement according to aspects of the present disclosure for a bidirectional dual-usage system where data communication channels and DFOS coexist on the same optical fiber. The system comprises of a fiber-pair supporting two-way communications between two nodes, which may illustratively be in two data centers or at add-drop/repeater sites. As shown, the communications channels and sensing pulses travel in opposite directions in each fiber to reduce their mutual nonlinear interference, allowing both systems to operate in the C-band with low loss. Advantageously, we may use diplexers to multiplex/demultiplex communication and sensing signals. As will be understood by those skilled in the art, this prevents out-of-band amplified spontaneous emission (ASE) noise from booster amplifiers "swamping" weak Rayleigh back-reflection of the DFOS system, which co-propagates with the communication channels at substantially lower power, as shown in the figure. Advantageously, only one fiber sensing interrogator is normally needed.

Optical Fiber Sensor Application—Intrusion Detection

Figure 11A:
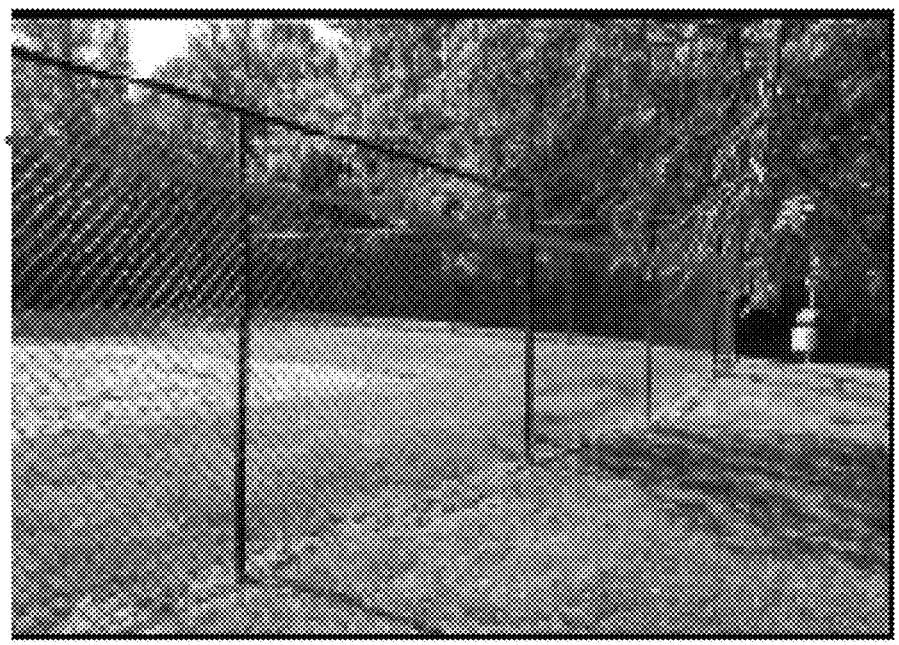
FIGS. 11(A)-11(B) show.

An important application of optical fiber sensors according to aspects of the present disclosure is detection of unauthorized intrusion at important facilities. By laying an optical fiber cable on a perimeter fence (FIG. 11(A)), it is possible to detect vibration over a wide-area at low cost compared with conventional deployment of security cameras.

Figure 11B:
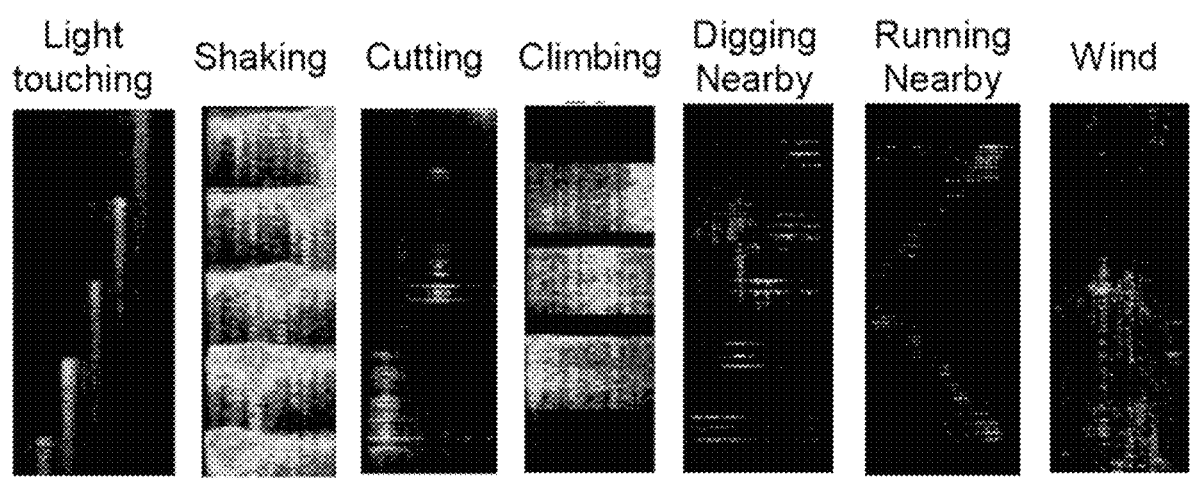

One challenge in intrusion detection is suppressing false alarms caused by perturbations of the natural environment (wind, rain etc.) as well as movements of small animals. Advantageously, systems, methods, and structures according to aspects of the present disclosure may leverage the power artificial intelligence (AI) to classify different events. FIG. 11(B) shows an example of different vibration patterns seen on the "waterfall plot" measured by a Rayleigh-based distributed vibration sensor (DVS). The optical fiber sensor generates raw data, which is then fed to the AI for training and for event classification.

Optical Fiber Sensor Application—Road Traffic Monitoring

Figure 12A:
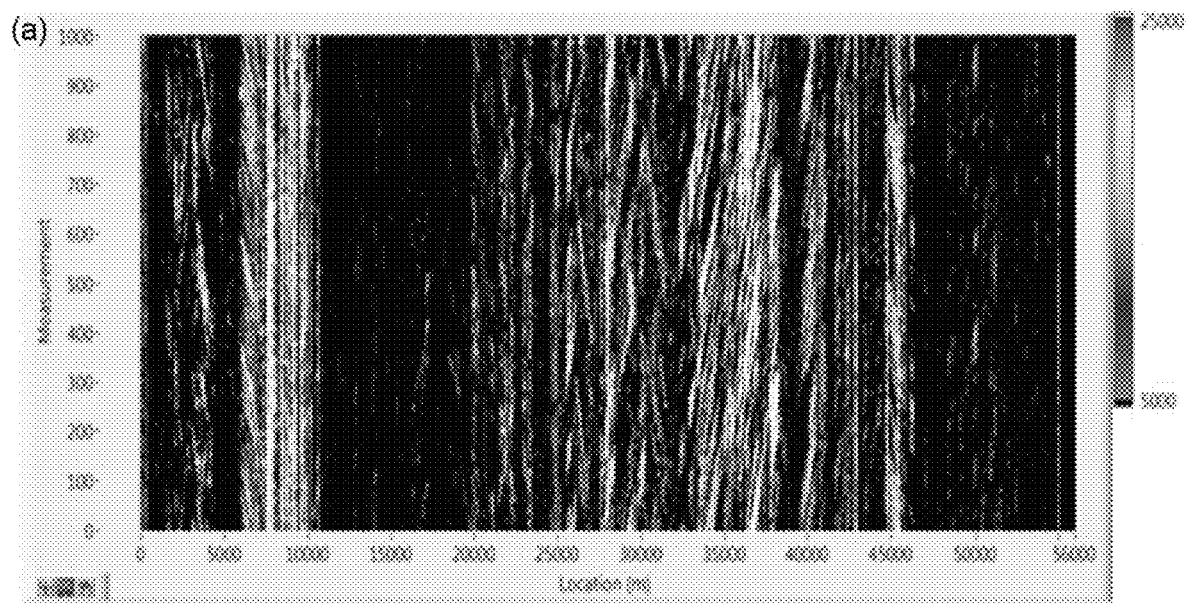
FIGS. 12(A)-12(C) show.
Figure 12B:
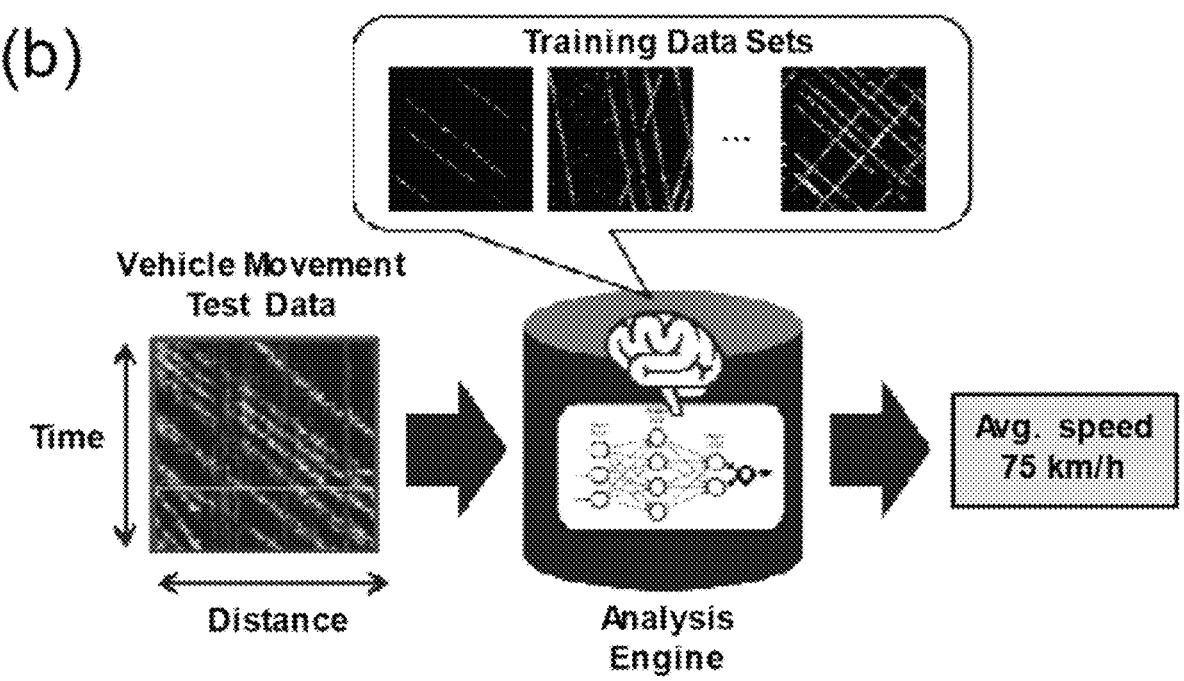
Figure 12C:
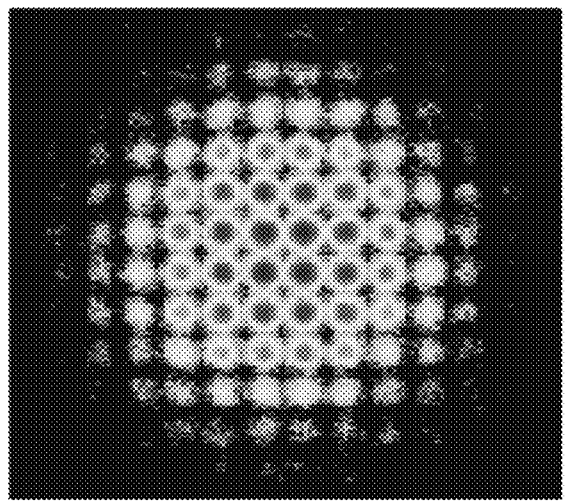
Figure 12C:
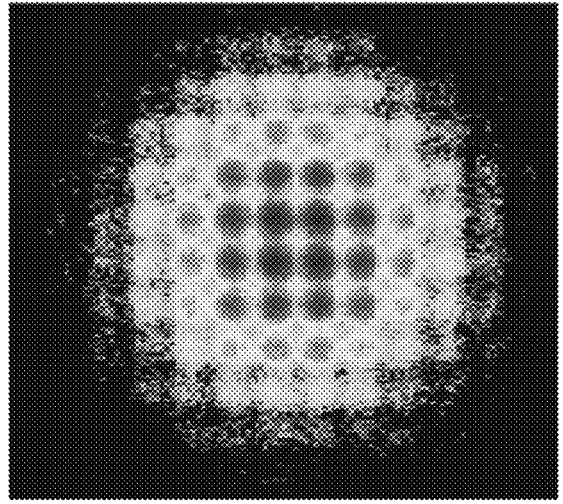

An additional application of optical fiber sensors according to aspects of the present disclosure is monitoring vehicular traffic. This application is particularly attractive as many optical cables are deployed near major arterial roads. Vehicular traffic creates vibration which changes position with time. FIG. 12(A) shows a "waterfall plot" recorded using Rayleigh-based DVS on a 55-km fiber cable in the Dallas metropolitan area. The horizontal and vertical axes denote fiber position and time, respectively. The speed of a vehicle can thus be inferred from the slope of the vibration features: a steeper slope denotes slower traffic (congestion), while a shallow slope denotes faster traffic (smooth flow). Positive and negative slopes denote different directions of travel. As with intrusion detection, "waterfall plots" like that in FIG. 12(A) can be used as training data for the AI, which can then monitor average vehicle speed with high degree of accuracy. In this field trial, the DFOS application coexisted with full Cband 38-Tb/s transmission of dense WDM (DWDM) traffic where each of the 92×48-Gbaud channels carried PS144QAM at net data rate ≥400-Gb/s and average spectral efficiency (SE) of 8.3 b//Hz. To allow simultaneous DOFS, we reserve a spectral hole of three 50-GHz channels. We note that in our experiments, the launch power of the sensing pulse was adjusted for optimum operation of both communication and DOFS systems. The presence of the sensing pulse did not produce any perceptible difference in signal quality of the transmission channels. Error free operation (pre-FEC BER<$2.2\times10^{-2}$) was achieved, demonstrating the feasibility of our systems, methods, and structures according to aspects of the present disclosure. FIG. 12(B) shows schematically a machine learning arrangement that may be employed to determine vehicular direction and average speed while FIG. 12(C) shows constellation diagrams of PS-144QAM channels counter-propagating against the DOFS system as determined experimentally.

Optical Fiber Sensor Application—Infrastructure Health Monitoring

Figure 13A:
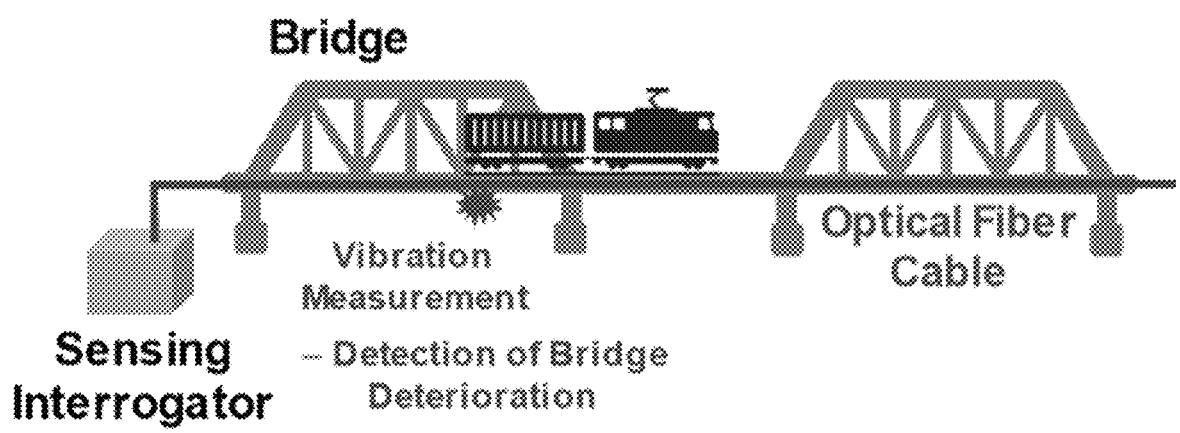
FIGS. 13(A)-13(B) show.
Figure 13B:
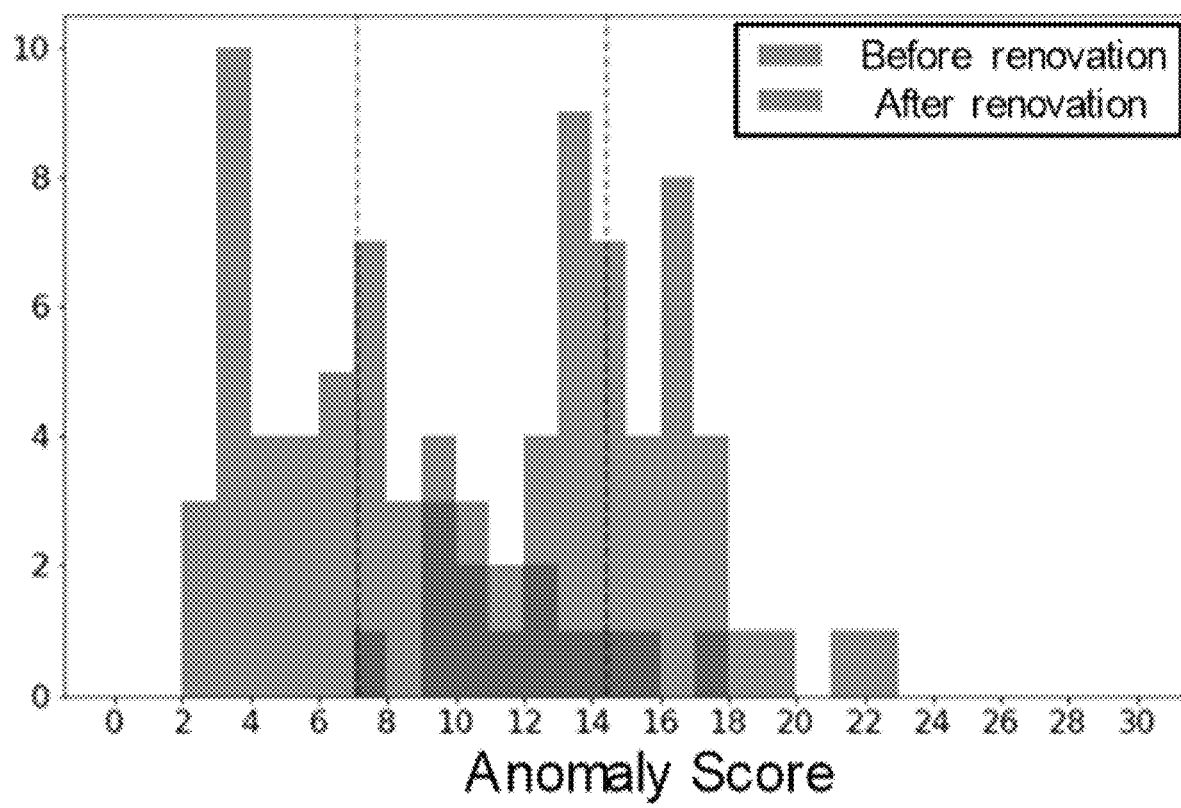

Yet another application of systems, methods, and structures according to aspect of the present disclosure involves monitoring the "health" of key infrastructure such as bridges. Since the natural frequencies of the structure, as well as the damping characteristics associated with each frequency, changes with physical deterioration. It is therefore possible to use DOFS for real-time monitoring of these changes in vibration characteristics. Training data sets for different states of deterioration of the reference structure are first generated with the help of human inspection. Once the AI is trained on the raw data, it is possible to monitoring large numbers of similar structures at low cost when they are traversed by a single optical cable. FIGS. 13(A)-13(B) show: FIG. 13(A) bridge structural health monitoring using DOFS; and FIG. 13(B) AI classification of bridge health showing distribution of "Anomaly score" before and after renovation according to aspects of the present disclosure.

As may be observed, the figure shows the type of field data recorded for a railway bridge. A clear difference is observed for the distribution of "anomaly score" before and after repairs, allowing 1 class classification of structural health using RAPID machine learning.

At this point, while we have presented this disclosure using some specific examples, those skilled in the art will recognize that our teachings are not so limited. Virtually any type of sensing that may take place over optical fiber may advantageously be included into systems, methods, and structures according to aspects of the present disclosure. Accordingly, this disclosure should be only limited by the scope of the claims attached hereto.

The invention claimed is:

1. A optical network (ON) arrangement including an optical line terminal (OLT), a remote node (RN), and an optical network unit (ONU), the OLT, RN, and ONU optically interconnected to one another by one or more segments of multi-fiber optical cable, the OLT including a transponder that transmits and receives optical data signals over one or more of the multiple fibers of the multi-fiber optical cable, said arrangement characterized by:

a distributed optical fiber sensing system (DOFS) integrator in optical communication with different one(s) of the multiple fibers of the multi-fiber optical cable, said DOFS detects changes in, and locations of the changes, in the different one(s) of the multiple fibers of the multi-fiber optical cable by optical pulse interrogation; and optical fiber loop-back from each of the ONUs.

2. The ON arrangement of claim 1 further characterized by:

the optical fiber loop-back from each of the ONUs comprises a single one of the optical fibers.

3. A optical network (ON) arrangement including an optical line terminal (OLT), a remote node (RN), and an optical network unit (ONU), the OLT, RN, and ONU optically interconnected to one another by one or more segments of multi-fiber optical cable, the OLT including a transponder that transmits and receives optical data signals over one or more of the multiple fibers of the multi-fiber optical cable, said arrangement characterized by:

a distributed optical fiber sensing system (DOFS) integrator in optical communication with different one(s) of the multiple fibers of the multi-fiber optical cable, said DOFS detects changes in, and locations of the changes, in the different one(s) of the multiple fibers of the multi-fiber optical cable by optical pulse interrogation; and an AWG and a cycling AWG located in the RN.

* * * * *